(12) United States Patent
Weigel

(10) Patent No.: US 6,464,140 B1
(45) Date of Patent: Oct. 15, 2002

(54) METHOD AND SYSTEM FOR IMPROVED DATA TRANSFER

(75) Inventor: Douglas Arthur Weigel, Palo Alto, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/722,276

(22) Filed: Nov. 28, 2000

(51) Int. Cl.[7] ................................................ G06K 7/10
(52) U.S. Cl. .............................. 235/462.07; 235/462.15
(58) Field of Search ....................... 235/462.07, 462.13, 235/462.25

(56) References Cited

U.S. PATENT DOCUMENTS

| | | | | |
|---|---|---|---|---|
| 5,218,673 A | * | 6/1993 | Fujiwara ..................... | 235/454 |
| 5,490,217 A | * | 2/1996 | Wang .......................... | 380/51 |
| 5,659,164 A | * | 8/1997 | Schmid et al. ............... | 235/375 |
| 5,754,308 A | * | 5/1998 | Lopresti et al. ............. | 358/403 |
| 5,804,803 A | * | 9/1998 | Cragun et al. ............... | 235/375 |
| 5,848,202 A | * | 12/1998 | D'Eri et al. ................. | 382/306 |
| 6,031,621 A | * | 2/2000 | Binder ........................ | 358/1.1 |
| 6,109,526 A | * | 8/2000 | Ohanian et al. ........ | 235/462.45 |
| 6,123,258 A | * | 9/2000 | Lida ........................... | 235/375 |
| 6,192,165 B1 | * | 2/2001 | Irons ........................... | 382/306 |
| 6,208,346 B1 | * | 3/2001 | Cunningham ............... | 358/474 |

* cited by examiner

*Primary Examiner*—Karl D. Frech
*Assistant Examiner*—Ahshik Kim

(57) ABSTRACT

A computer system and a method used by the system are disclosed for processing data received by a network input device, such as a scanner or digital camera, that is available to multiple terminals or users. Profiles are created representing different preferences for data processing. Different profiles are associated with different identification codes. The identification codes are read, the data is received by the input device, and the data is then processed according to the preferences in the profile that corresponds to the identification code. The profile may set such preferences as the format of the data, the terminal to which it is sent, the directory to which it is saved, the manner in which it is delivered, and any other attributes that are helpful to processing the data. In one use, a user may have a unique user identification code and profile that instruct the system where, when, and how to send the input data. The system recognizes the user's identifier when the data is input and processes the data according to the user's profile.

20 Claims, 3 Drawing Sheets

Profile                                        ⟋ 100

Identification Code

Terminal ID         _____

Data Format         _____

File Directory      _____

Delivery            _____

*Fig. 2*

METHOD AND SYSTEM FOR IMPROVED DATA TRANSFER

FIELD OF THE INVENTION

The invention relates generally to computer systems. More particularly, it relates to an improved system for processing data received by an input device.

BACKGROUND

Computer input devices, such as scanners, digital cameras, etc. may be connected directly to a single computer, or they may be used in conjunction with a computer network. The input device may be connected permanently, or semi-permanently, to the computer or network, for example if the input device is a large, flat scanner. It may also be removable from the computer or network and may store data in its own local memory until the input device is reconnected to the computer or network, such as with a digital camera. If the input device is removable, it may have a docking station or similar port adapted for connecting the input device to the network.

An advantage of connecting the input device to a computer network is that multiple users may use the same input device. Existing systems allow multiple users to scan their documents (in the case of a scanner), but they are cumbersome. Existing systems process all input data the same way without recognizing different users or different projects. Existing systems create files for the data and store those files in the same format and in the same location for each user.

Some systems have a terminal associated with the input device that is used to manage the input data. For example, a terminal that is used with a scanner may open the scanned document into software associated with the scanner. The user must then find a way to get the document to the user's terminal. The user might, for example, save the document to a file on the network and then open the file from his or her terminal. Alternatively, the user may save the document as a file to a floppy disk or may send the file via email. Once the user receives the file at his or her own terminal, the file may still have to be reformatted. For example, if the data is a scanned image that is to be input into a document, the user must open the document, open the scanned file, and insert the scanned file image into the document. In this example, the user wants the object of the input data and may have no use for a separate data file. The user may have no need at all for a separate file for each object that is received by the input device. Yet, existing systems require users to perform multiple steps to format the data as desired.

SUMMARY OF THE INVENTION

A computer system and a method used by the system are disclosed for processing data received by a network input device, such as a scanner or digital camera, that is available to multiple terminals or users. Profiles are created representing different preferences for data processing. Different profiles are associated with different identification codes. The identification codes are read, the data is received by the input device, and the data is then processed according to the preferences in the profile that corresponds to the identification code. The profile may set such preferences as the format of the data, the terminal to which it is sent, the directory to which it is saved, the manner in which it is delivered, and any other attributes that are helpful to processing the data. In one use, a user may have a unique user identification code and profile that instruct the system where, when, and how to send the input data. The system recognizes the user's identifier when the data is input and processes the data according to the user's profile.

SUMMARY OF THE DRAWINGS

FIG. 2 shows an example profile.

DETAILED DESCRIPTION

Figure 1:
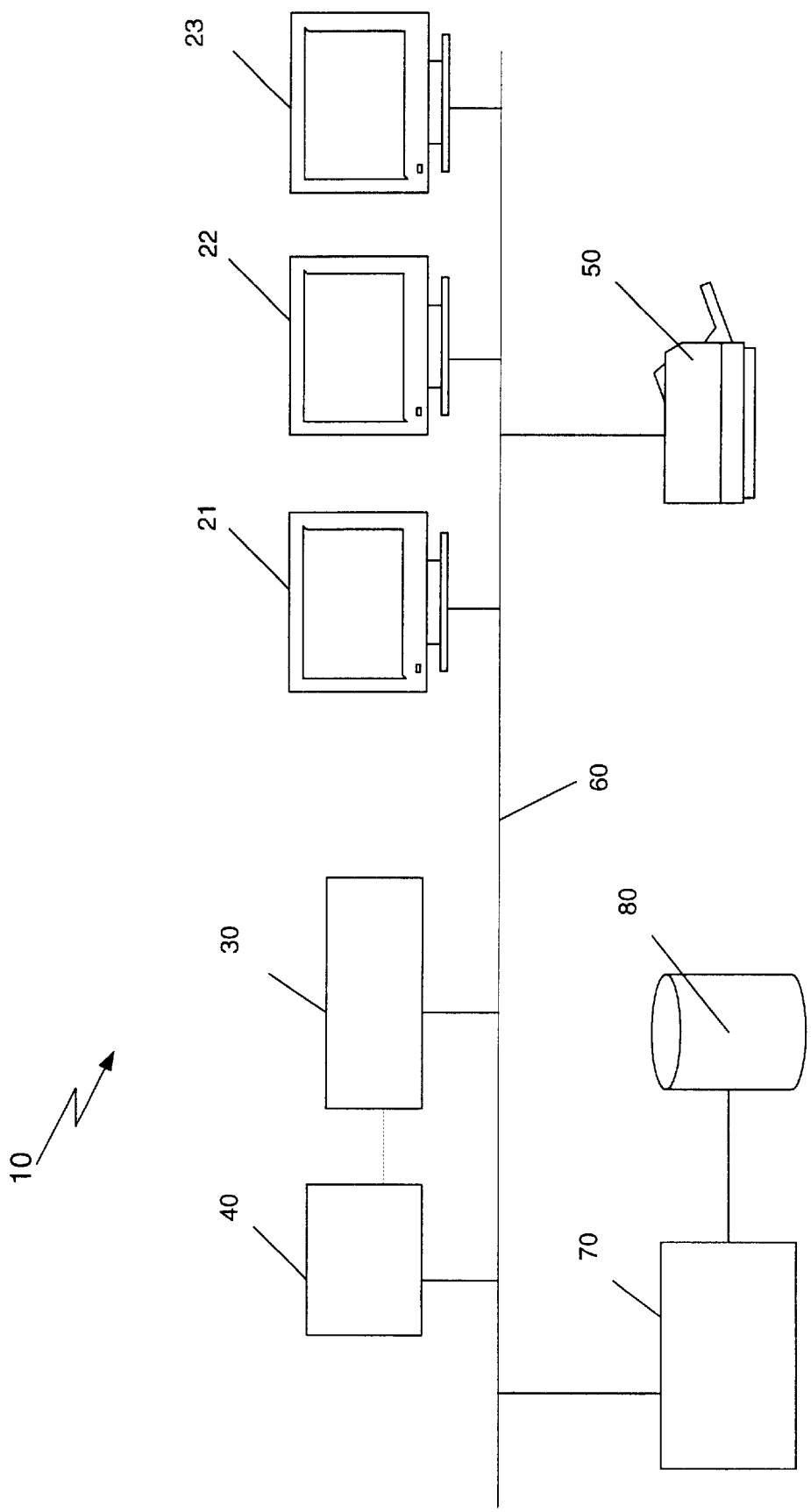
FIG. 1 is a block diagram of the system.

FIG. 1 shows a block diagram of the system 10 having a network 60, such as a local area network (LAN) 60, connected to a server 70. Terminals 21, 22, 23, such as personal computers, may be connected to the network 60. Other devices such as a printer 50 may also be connected to the network 60. The terminals 21, 22, 23 may be adapted to print to a common network printer 50. The network 60 may also be connected to an input device 30 for receiving data. The input device 30 may be a scanner, a camera, such as a digital still-frame camera or a digital video camera, a personal digital assistant (PDA), or any other device capable of receiving data for use by the terminals 21, 22, 23. It should be recognized that the network 60 may be substantially larger than shown in FIG. 1 and may include substantially more terminals and other devices.

The system 10 also includes an identification code reader 40 connected to the network 60. The identification code reader 40 receives a unique identification code and interacts with the input device 30 to control the processing of data received by the input device 30. The identification code may be a code that is unique to a user, a terminal, a project, or any other desired setting. The identification code may have certain settings or preferences associated with it for processing the input data, which settings are referred to as a profile 100, as shown in FIG. 2. For example, an identification code unique to a user may reference a user profile 100 that stores information about how the user wants the data processed. The profile 100 may include information such as the network address or internet protocol (IP) address of a terminal. Profiles 100 may be stored in a memory 80 in the system 10, such as a database 80 accessed by the server 70.

FIG. 2 shows an example of a profile 100 and the data fields that it might contain. In this example, the profile 100 maintains fields for a terminal identifier, a data format preference, a file directory, and a delivery preference. As described herein, a profile 100 may be referenced as a user profile 100, indicating that every user has a different terminal and has a unique profile 100. The system 100 can apply to profiles 100 based on any desired grouping. Depending upon the user's needs, a profile 100 may be assigned to one or more users, projects, terminals, etc.

A user profile 100 may indicate, for example, a data destination that indicates where the data should be sent. The data destination may include a file name if the data is to be deposited into a file, a directory if the data is to be saved in a directory in a memory, an electronic mail address if the data is to be sent via email to a particular address or addresses, a terminal identifier if the data is to be sent to a particular terminal, or a network address, such as an IP address, if the data is to be sent to any other network destination. The data destination may also include any other destination selected by a profile 100 to which the input device is capable of sending data. The profile 100 may also indicate, for example that data input by the user should be saved to a new file, that it should be sent to the user's terminal and opened as a new file in an application, that it should be directly input into an existing open document, or that it should be sent to a printer or other device. If the user's profile 100 indicates that new files should be created and saved, it may indicate a directory and a format for the file. The profile may specify a format preference to indicate how data should be formatted. If the file is sent to the user's terminal, the system 10 may cause the terminal to launch a particular application to view the document or may save the file to a directory, depending upon a delivery option in the profile 100. The data may also be added directly to an existing document without opening the document or launching the application on the user's terminal. The profile 100 may include an email address of the user, and the profile 100 may specify that the data be sent via email in a particular format. In any of these examples, the system 10 may use the user profile 100 as default settings and may prompt the user for changes to these settings. Also, with respect to any of these examples, the system 10 may prompt the user at any point in process, such as a prompt before opening an application or before inserting an object.

Figure 3:
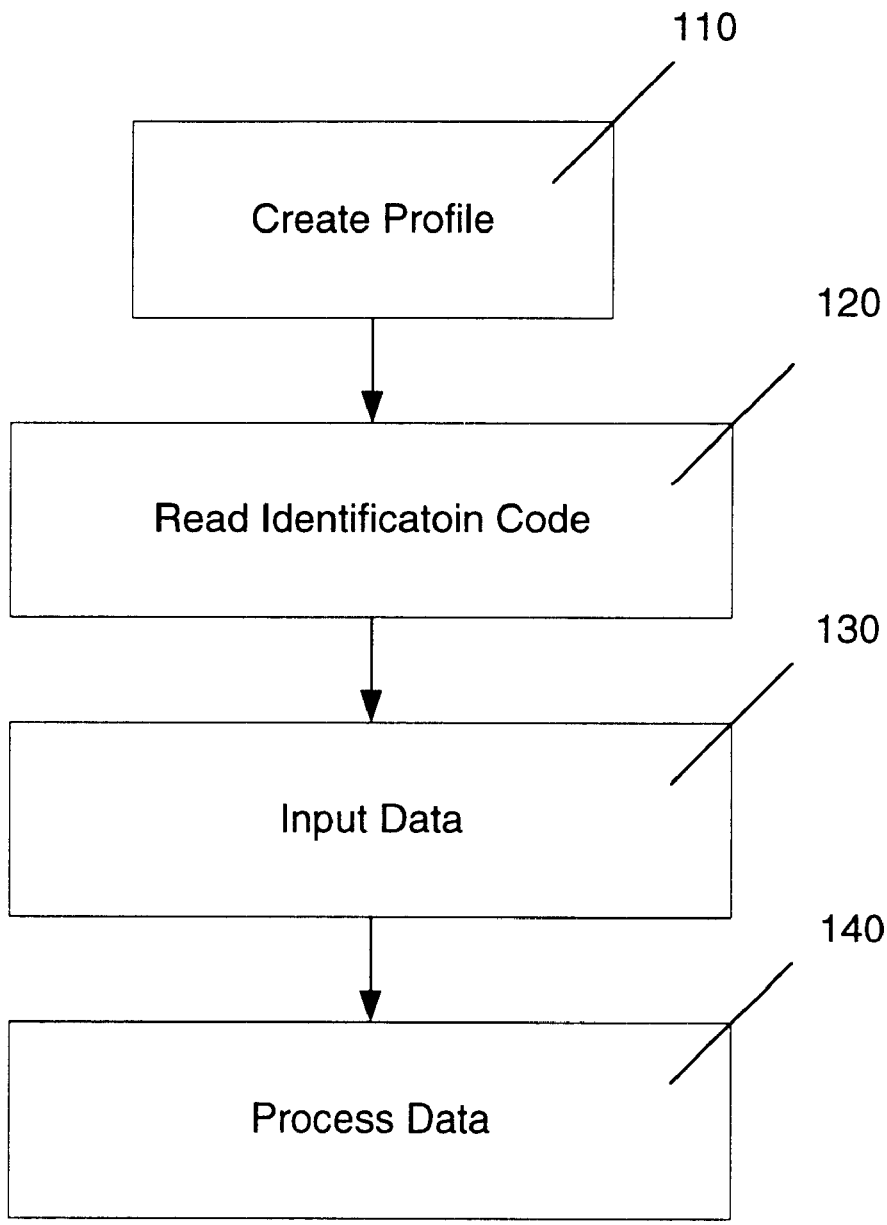
FIG. 3 shows a flow chart of the steps used by the system.

FIG. 3 shows a flow chart of the steps used by the system 10. A profile 100 is created 110 and associated with an identification code. The profile 100 indicates how to process data associated with the profile's identification code. The profile 100 may be set by the user or the system 10, or it may be a default profile 100. When data is to be input into the input device 30, the identification code is read 120 by the identification code reader 40 so that the system 10 knows which profile is associated with the data that is about to be input. After the identification code is read 120, the input device 30 receives 130 the data and processes 140 it according to the profile 100.

The identification code may be stored in any available media. For example, it may be a magnetic strip of a card, a tuned electronic circuit, a bar code, a manually-input code, a fingerprint, voice, or retina scan, or any other identification system whether used currently or developed hereafter. In one embodiment, the identification code may be a bar code that is printed by the system 10 when a profile 100 is created.

In one embodiment the input device 30 and the identification code reader 40 may be part of the same physical device and the input device 30 may read 120 the identification code and may also receive 130 the input data in one or more steps. A bar code or other written information may represent the identification code, and that bar code may be placed directly on the documents that are input as data. For example, the bar codes may be placed on adhesive and attached to each document. The system 10 may search the input data for bar codes and may identify the profile 100 based on codes that are found. If no identification codes are found, the system 10 may prompt the user for an identification code before, during, or after receiving 130 the data.

Alternatively, a bar code or other identifier may appear on a blank sheet of paper that is read by the input device 30 before other data is entered. In a stack of documents to be input, the bar code sheet may be positioned such that the input device 30 reads it first and identifies a profile 100 based upon the identification code. This profile 100 could then apply to all data entered after the bar code sheet is read, but before a new bar code sheet is read and preferably within limited time period after the last document is read, such that a particular profile "times out" if data is not continuously sent to the input device 30.

Although the present invention has been described with respect to particular embodiments thereof, variations are possible. The present invention may be embodied in specific forms without departing from the essential spirit or attributes thereof. One skilled in the art will recognize that the input device may be any device that receives data, particularly any data-receiving device that is available to a plurality of users or terminals through a computer network or otherwise. The identification code may be any identifier that is linked with a list of preferences, such as the profile, and the identification code reader may be any suitable reader for the identification code. The profile may contain any information desired by the user that helps the system 10 determine how to process the input data. It is desired that the embodiments described herein be considered in all respects illustrative and not restrictive and that reference be made to the appended claims for determining the scope of the invention.

I claim:

1. An automated data processing system comprising:
   an identification code reader;
   a memory that correlates an identification code with a profile, wherein the profile specifies user-selected parameters for processing data, the parameters being related to:
   a data format preference;
   a file directory preference; and
   a delivery preference; and
   an input device electronically connected to the identification code reader, which input device receives data and processes the data according to the profile associated with the identification code, wherein the input device formats the data according to the data format preference and delivers the data to a data destination specified by the delivery preference.

2. The system of claim 1, wherein the input device is a scanner or a camera.

3. The system of claim 1, wherein the identification code is a bar code printed onto a bar code sheet separate from the data, when the profile is created, and wherein the identification code reader reads the bar code before the input device receives the data.

4. The system of claim 1, wherein the identification code reader is part of the input device and wherein the identification code is read while data is received by the input device.

5. A computer-readable medium having computer-executable instructions for performing a method for processing data received by an input device comprising:
   reading an identification code;
   receiving data from an input device;
   retrieving from memory a profile associated with the identification code, wherein the profile specifies parameters for processing data, the parameters being related to:
   a data format preference;
   a file directory preference; and
   a delivery preference;
   formatting the data according to the data format preference; and
   sending the data to a data destination specified in the delivery preference.

6. A method for processing data received by an input device comprising:
   reading an identification code;
   receiving data from a source separate from the identification code;
   formatting the data based on a data format preference specified in a profile associated with the identification code; and sending the data to a data destination specified as a delivery preference in the profile.

7. The system of claim 1, wherein the profile further specifies parameters related to a terminal, and wherein the input device sends the data to the terminal, based on the delivery preference.

8. The system of claim 7, wherein, based on the delivery preference and data format preference, the input device launches an application to view the data using the terminal.

9. The system of claim 1, wherein, based on the delivery preference and data format preference, the input device saves the data to the file directory.

10. The system of claim 1, wherein, based on the delivery preference and data format preference specified in the profile, the input device creates a new file, stores the data in the new file, and saves the file in the file directory.

11. The system of claim 1, wherein, based on the delivery preference, the input device sends the data to an email address identified in the profile.

12. The system of claim 1, wherein the identification code reader reads the identification code from a tuned electronic circuit.

13. The medium of claim 5, wherein the step of sending the data comprises sending the data to an electronic mail address.

14. The medium of claim 5, wherein the step of sending the data comprises sending the data to a network address.

15. The medium of claim 5, wherein the step of reading comprises reading the identification code from a document that contains the data, whereby the identification code is part of the document.

16. The medium of claim 5, wherein the step of reading comprises reading the identification code before reading the data, from a source separate from the data.

17. The medium of claim 5, wherein the step of retrieving the profile comprises retrieving a profile that further specifies parameters related to a terminal;

wherein the step of sending comprises sending the data to the terminal, based on the delivery preference; and wherein the method further comprises opening the data in an application displayed on the terminal, based on the data format preference.

18. The method of claim 6, wherein the step of formatting comprises formatting based on a data format preference specified in the profile, the profile being unique to a particular user or to a particular project, and wherein the step of receiving comprises receiving data from a scanner.

19. The method of claim 6, further comprising adding the data to an existing electronic file, based on t he delivery preference and data format preference.

20. The method of claim 6, wherein the step of sending comprises sending the data to a terminal specified in the profile, based on the delivery preference; and further comprising opening the data in an application displayed on the terminal, based on the data format preference.

* * * * *